United States Patent
Bareddy

(10) Patent No.: US 10,596,695 B1
(45) Date of Patent: Mar. 24, 2020

(54) REPLACING A FIRST ROBOT WITH A SECOND ROBOT DURING PERFORMANCE OF A TASK BY THE FIRST ROBOT

(71) Applicant: X Development LLC, Mountain View, CA (US)

(72) Inventor: Mallinath Bareddy, Sunnyvale, CA (US)

(73) Assignee: X DEVELOPMENT LLC, Mountain View, CA (US)

(*) Notice: Subject to any disclaimer, the term of this patent is extended or adjusted under 35 U.S.C. 154(b) by 218 days.

(21) Appl. No.: 15/727,199

(22) Filed: Oct. 6, 2017

Related U.S. Application Data

(63) Continuation of application No. 14/821,730, filed on Aug. 8, 2015, now Pat. No. 9,821,455.

(51) Int. Cl.
| | |
|---|---|
| G05B 19/418 | (2006.01) |
| B25J 9/00 | (2006.01) |
| G06Q 10/06 | (2012.01) |
| H04N 7/15 | (2006.01) |
| H04N 7/14 | (2006.01) |
| B25J 9/16 | (2006.01) |

(52) U.S. Cl.
CPC .......... B25J 9/0084 (2013.01); B25J 9/1689 (2013.01); G06Q 10/06 (2013.01); H04N 7/142 (2013.01); H04N 7/15 (2013.01); G05B 19/4186 (2013.01); G05D 2201/0211 (2013.01); Y10S 901/01 (2013.01); Y10S 901/47 (2013.01)

(58) Field of Classification Search
CPC ...... B25J 9/0084; B25J 9/1689; B25J 19/023; H04N 7/142; H04N 7/15; G06Q 10/06; G06Q 10/0631; G06Q 10/06311; G06Q 10/063112; Y10S 901/01; Y10S 901/47; G05B 19/4186; G05B 2219/39117; G05B 2219/39146; G05D 2201/0211

See application file for complete search history.

(56) References Cited

U.S. PATENT DOCUMENTS

| | | |
|---|---|---|
| 5,442,728 A | 8/1995 | Kaufman et al. |
| 7,765,028 B2 | 7/2010 | Orita |
| 9,008,839 B1 | 4/2015 | Kuffner, Jr. et al. |

(Continued)

OTHER PUBLICATIONS

Yang, X. (2011). Robots In My Contact List: Using Social Media Platforms For Human-Robot Interaction In Domestic Environment. A Thesis Submitted for the Degree of Master of Science, Department of Computer Science, School of Computing; National University of Singapore. 113 pages.

(Continued)

*Primary Examiner* — Harry Y Oh
(74) *Attorney, Agent, or Firm* — Middleton Reutlinger

(57) ABSTRACT

Methods, apparatus, systems, and computer-readable media are provided for selecting a first robot for a robot task of a user, and during a first session between a computing device of the user and the first robot to perform the task, determining a need for the first robot to perform an alternative task. Based on determining the need, a second robot is selected to "replace" the first robot in performing the task. The second robot may replace the first robot in performing the task by directing the telepresence robot to navigate to a location proximal to the first robot and transitioning the first telepresence robot's session to the second telepresence robot.

14 Claims, 8 Drawing Sheets

(56) References Cited

U.S. PATENT DOCUMENTS

| | | | |
|---|---|---|---|
| 9,821,455 B1* | 11/2017 | Bareddy | B25J 9/0084 |
| 2010/0174436 A1 | 7/2010 | Matsunaga | |
| 2011/0166701 A1 | 7/2011 | Thacher et al. | |
| 2011/0288684 A1 | 11/2011 | Farlow et al. | |
| 2012/0152877 A1* | 6/2012 | Tadayon | B25J 5/02 212/224 |
| 2015/0148951 A1* | 5/2015 | Jeon | G05D 1/0219 700/248 |
| 2015/0201160 A1 | 7/2015 | Polyakov et al. | |

OTHER PUBLICATIONS

Coltin, B., Veloso, M. M., & Ventura, R. (Aug. 2011). Dynamic User Task Scheduling for Mobile Robots. In Automated Action Planning for Autonomous Mobile Robots. 6 pages.

Parker, L. E. (Sep. 1994). Alliance: An Architecture For Fault Tolerant, Cooperative Control of Heterogeneous Mobile Robots. In Intelligent Robots and Systems' 94.'Advanced Robotic Systems and the Real World', IROS'94. Proceedings of the IEEE/RSJ/GI International Conference on (vol. 2, pp. 776-783). IEEE.

Gerkey, B. P., & Mataric, M. J. (Sep. 2003). Multi-Robot Task Allocation: Analyzing The Complexity And Optimality Of Key Architectures. In Robotics and Automation, 2003. Proceedings. ICRA'03. IEEE International Conference on (vol. 3, pp. 3862-3868). IEEE.

Lerman, K., Jones, C., Galstyan, A., & Mataric, M. J. (2006). Analysis Of Dynamic Task Allocation In Multi-Robot Systems. The International Journal of Robotics Research, 25(3), 225-241.

Krieger, M. J., & Billeter, J. B. (2000). The Call Of Duty: Self-Organised Task Allocation In A Population Of Up To Twelve Mobile Robots. Robotics and Autonomous Systems, 30(1), 65-84.

Bhattacharya, A., Sarkar, B., & Mukherjee, S. K. (2005). Integrating AHP with QFD for Robot Selection Under Requirement Perspective. International journal of production research, 43(17), 3671-3685.

Berman, S., Halasz, A., Hsieh, M. A., & Kumar, V. (2009). Optimized Stochastic Policies For Task Allocation In Swarms Of Robots. Robotics, IEEE Transactions on, 25(4), 927-937.

Desai, M., Tsui, K. M., Yanco, H., & Uhlik, C. (Apr. 2011). Essential Features of Telepresence Robots. In Technologies for Practical Robot Applications (TePRA), 2011 IEEE Conference on (pp. 15-20). IEEE.

* cited by examiner

REPLACING A FIRST ROBOT WITH A SECOND ROBOT DURING PERFORMANCE OF A TASK BY THE FIRST ROBOT

BACKGROUND

Robots may be programmed to perform a variety of tasks. For example, some telepresence robots may be programmed to function as "video conferencing on wheels". For instance, some telepresence robots may include a microphone and a camera and provide a "live" video feed from the camera and a "live" audio feed from the microphone to a user's computing device to provide a sense of the telepresence robot's environment to the user. Also, for instance, some telepresence robots may further include a display device that displays: an image of the user, a "live" video and/or audio feed from a camera coupled to the user's computing device, and/or another indicia of the user to provide a visual and/or audible indication of the user to individuals that are in the environment with the telepresence robot. Also, for instance, some telepresence robots may be able to navigate to various locations autonomously, semi-autonomously, and/or based on control commands provided by a user via a computing device of the user.

Various techniques may be employed for scheduling tasks of a robot. For example, in response to identification of a task to be performed by a robot, a scheduling system may identify a robot that is "available" to perform that task, assign that robot to performance of the task, and flag that robot as "unavailable" while it is performing the task. However, some techniques for scheduling tasks of a robot may suffer from one or more drawbacks. For example, some techniques may not enable a first robot that is actively performing a task to be replaced by a second robot to perform that task. Also, for example, some techniques may not enable replacement of a first robot with a second robot in response to a need of the first robot to perform one or more alternative tasks. Also, for example, some techniques may not employ one or more techniques to alleviate the impact of robot replacement to individuals in the environment with the robot and/or individuals that are controlling the robot and/or consuming data provided by the robot. Additional and/or alternative drawbacks may be presented.

SUMMARY

The present disclosure is generally directed to selecting, from a plurality of potential robots, a preferred robot for a task based on one or more properties of the task and/or one or more properties of one or more of the potential robots. More particularly, implementations of the technology relate to selecting a first telepresence robot for a robot task of a user, and during a first session between a computing device of the user and the first telepresence robot to perform the task, determining a need for the first telepresence robot to perform an alternative task. Based on determining the need, a second telepresence robot is selected to "replace" the first telepresence robot in performing the task. The second telepresence robot may replace the first telepresence robot in performing the task by directing the second telepresence robot to navigate to a location proximal to the first telepresence robot and transitioning the first telepresence robot's session to the second telepresence robot. For example, a video feed provided to the user may be switched from a video feed of the first robot to a video feed of the second robot, a video feed or other indicia of the user that is displayed on a display of the first robot may be switched to a display of the second robot, etc. Some implementations may employ one or more techniques to alleviate the impact of robot replacement on one or more individuals in the environment with the robot and/or one or more individuals that are controlling the robot and/or consuming data provided by the robot.

The need for the first telepresence robot to perform the additional task may be based on one or more properties of the additional task, one or more properties of the original task, one or more properties of the first telepresence robot, and/or one or more properties of other telepresence robots. For example, the additional task may be a charging task (recharging the battery of the first telepresence robot) and the need may be determined based on, for example: determining a charge level of the battery (a property of the first telepresence robot) is less than a threshold and/or determining the charge level of the battery is insufficient to last an expected duration of the original task (a property of the original task). The expected duration of the original task may be determined based on a schedule for the original task (e.g., referencing a user's calendar to determine the expected duration), a database that maps tasks with expected durations (e.g., based on analysis of durations of past tasks), etc. As another example, where the additional task is not a recharging task, the need may be determined based on determining the first telepresence robot is better suited to perform the additional task than the second telepresence robot (and optionally better suited than one or more other available telepresence robots). For instance, the additional task may require a software and/or hardware component that the first telepresence robot has, but the second telepresence robot lacks.

As one example, assume Robot A has telepresence functionality and is currently being used by User A to remotely attend a meeting. Further assume Robot A has a "gripper" end effector, User B needs to perform a task that requires a gripper (e.g., a task of "pick up item A and bring it to me"), and the currently un-used robots have telepresence functionality but do not have gripper end effectors. In such a situation, a currently un-used robot (Robot B) may navigate to Robot A and "replace" Robot A (e.g., User A's session may be transitioned from Robot A to Robot B), then Robot A may be directed to another location to perform the gripping task for User B.

As another example, assume Robot A has telepresence functionality and is currently being used by User A to remotely take a tour of a museum. Further assume the charge level of a battery of Robot A has fallen below a threshold charge level and/or the charge level is insufficient to last until a scheduled end time of the tour. In such a situation, another robot (e.g., Robot B) with sufficient charge may navigate to a location proximal to Robot A and "replace" Robot A, then Robot A may be directed to a charging station.

As yet another example, assume Robot A has telepresence functionality and is currently being used by User A to remotely attend a meeting that is scheduled to end in thirty minutes. Further assume User B has requested a telepresence robot for a two hour time period and that Robot A has a battery with a charge level that would enable it to last for two hours, whereas other robots do not have a charge level that would last for two hours. In such a situation, another robot (Robot B) with sufficient charge to last through user A's meeting (scheduled to end in thirty minutes), but insufficient to last for the two hour time period, may navigate to a location proximal to Robot A and "replace" Robot A, then Robot A may be directed to a location to satisfy User B's request.

In some implementations, a method may be provided that includes identifying a robot task of a user, selecting a telepresence robot to perform the robot task, identifying a computing device of the user that is located remote from the telepresence robot, and initiating establishment of a first session between the computing device and the selected telepresence robot. During the first session the computing device and the telepresence robot exchange data via one or more networks to perform the robot task. The method further includes determining, during the first session, a need for the telepresence robot to perform an alternative task, selecting an alternative telepresence robot to perform the robot task in response to determining the need for the telepresence robot to perform the robot task, directing the alternative telepresence robot to navigate to a location proximal to the telepresence robot, and determining the alternative telepresence robot has reached the location. The method further includes, in response to determining the alternative telepresence robot has reached the location, initiating establishment of a second session between the computing device and the alternative telepresence robot to perform the telepresence task and directing the telepresence robot to a second location to perform the alternative task. The second session replaces the first session and during the second session the computing device and the alternative telepresence robot exchange additional data via one or more of the networks to perform the robot task; and This method and other implementations of technology disclosed herein may each optionally include one or more of the following features.

In some implementations, the method further includes identifying an orientation of the telepresence robot prior to establishment of the second session and directing the alternative telepresence robot to mimic the orientation of the telepresence robot at the location prior to establishment of the second session.

In some implementations, during the first session the telepresence robot transmits a video feed from a first camera of the telepresence robot to the computing device and during the second session the alternative telepresence robot transmits a second video feed from a second camera of the alternative telepresence robot to the computing device. In some of those implementations, the method further includes identifying a value of a characteristic of the first camera prior to establishing the second session and directing the alternative telepresence robot to adjust the second camera to mimic the value prior to establishing the second session. The characteristic may be selected from the group consisting of: a pan of the first camera, a tilt of the first camera, and a field of view of the first camera.

In some implementations, the alternative task is an additional robot task of an additional user and determining the need for the telepresence robot to perform the alternative task includes: identifying the alternative task and determining, based on at least one property of the alternative task, that the telepresence robot is better suited than the alternative telepresence robot to perform the alternative task. For example, determining that the telepresence robot is better suited to perform the alternative task than the alternative telepresence robot may include: determining that the telepresence robot is capable of performing the alternative task and that the alternative telepresence robot is incapable of performing the alternative task. Also, for example, the at least one property may be a robot tool required to perform the alternative task and determining that the telepresence robot is better suited than the alternative telepresence robot to perform the alternative task may include: determining that the telepresence robot includes the robot tool and that the second telepresence robot does not include the robot tool. Also, for example, the at least one property may be an anticipated duration of the alternative task and determining that the telepresence robot is better suited than the alternative telepresence robot to perform the alternative task may include: determining a charge level of a battery of the telepresence robot at an end of the anticipated duration will satisfy a threshold charge level; and determining a charge level of a battery of the alternative robot at the end of the anticipated duration will fail to satisfy the threshold charge level.

In some implementations, the alternative task is a charging task for charging a battery of the telepresence robot. In some of those implementations, determining the need for the telepresence robot to perform the charging task includes determining a charge level of the battery fails to satisfy a threshold charge level and/or identifying a scheduled end time of the robot task of the user and determining a charge level of the battery at the scheduled end time will fail to satisfy a threshold charge level. In some of those implementations, the method may further include identifying electronically stored calendar data that is personal to the user and identifying the scheduled end time of the robot task of the user based on the electronically stored calendar data.

In some implementations, during the first session the computing device transmits control commands to the telepresence robot that dictate one or more of: locomotive control of the telepresence robot, display control of a display device of the telepresence robot, and control of a speaker of the telepresence robot.

In some implementations, the method further includes displaying, during the first session, a video feed of the user on a display device of the first telepresence robot and displaying, during the second session, the video feed of the user on a display device of the alternative telepresence robot.

Other implementations may include a non-transitory computer readable storage medium storing instructions executable by a processor to perform a method such as one or more of the methods described above. Yet another implementation may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
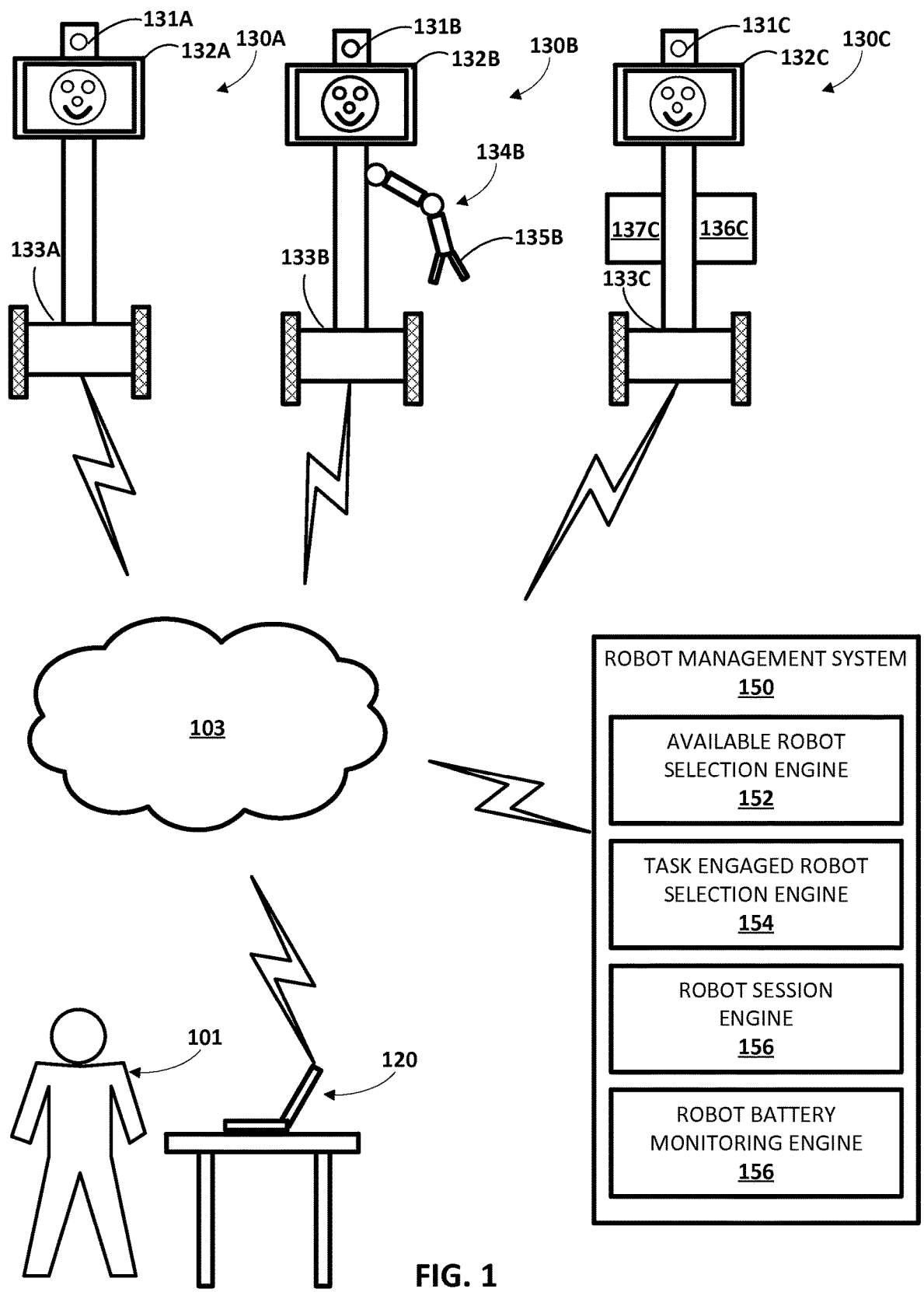
FIG. 1 illustrates an example environment in which disclosed techniques may be implemented.

FIG. 1 illustrates an example environment in which disclosed techniques may be implemented. Three telepresence robots 130A, 130B, and 130C are illustrated in the example environment of FIG. 1. Each of the telepresence robots 130A-C may be located in an area such that they can each navigate to one another within battery capacity constraints of the telepresence robots 130A-C. For example, the telepresence robots 130A-C may be located in a building (e.g., a warehouse, a manufacturing facility, an office building), in one or more buildings of a collection of nearby buildings, in one or more floors of a multi-floor office or other building, etc. Additional and/or alternative robots may be provided in other implementations, such as additional telepresence robots that vary in one or more respects from those illustrated in FIG. 1.

Each of the telepresence robots 130A-C includes a corresponding base 133A-C with wheels provided on opposed sides thereof for locomotion of a corresponding of the telepresence robots 130A-C. Each of the bases 133A-C may include, for example, one or more motors for driving corresponding wheels to achieve a desired direction, velocity, and/or acceleration of movement for the corresponding telepresence robot 130A-C.

Each of the telepresence robots 130A-C further includes a corresponding display screen 132A-C. In some implementations, the display screens 132A-C may display some indicia of a user when an active session has been established between a computing device of the user and a corresponding telepresence robot 130A-C. The indicia of the user may be, for example, an image of the user, a live video feed from a camera coupled to the user's computing device, etc. Other information may additionally and/or alternatively be displayed on the display screens 132A-C during and/or outside of an active session, such as status information indicating a charge level of a battery of a corresponding telepresence robot 130A-C, information indicating a task the corresponding telepresence robot 130A-C is currently engaged in, etc. In some implementations, a speaker may also be coupled to the display screens 132A-C and/or other component of a corresponding telepresence robot 130A-C and may provide an audio feed from a microphone coupled to a computing device having an active session with the corresponding telepresence robot 130A-C. Providing visual and/or audible indications of a user that has an active session with a corresponding telepresence robot 130A-C may enable the user to communicate with other individuals and/or robots that are in the environment with the telepresence robot 130A-C.

Each of the telepresence robots 130A-C further includes a corresponding camera 131A-C. A microphone may also be provided with each of the cameras 131A-C and/or coupled to another component of a corresponding of the telepresence robots 130A-C. The cameras 131A-C and microphone may enable a "live" feed to be provided to a user's computing device during an active session to provide a sense of the telepresence robot's environment to the user.

Each of the telepresence robots 130A-C also include one or more controllers that, for example, provide control commands to actuators and/or other operational components of a corresponding telepresence robot 130A-C, drive a corresponding display screen 132A-C, receive and act upon control commands from a computing device, and/or provide a visual and/or audio feed and/or other data to the computing device. For example, one or more controllers of telepresence robot 130A may provide control commands to servo motors that drive the wheels of the telepresence robot 130A to navigate the telepresence robot 130A to various locations in the environment autonomously, semi-autonomously, and/or based on control commands provided by a user via a computing device of the user. Also, for example, one or more controllers of telepresence robot 130A may establish a session with a computing device of a user, transmit a video feed from camera 131A to the computing device, and/or receive a video feed from the computing device and provide it on display screen 132A. Additional description of some examples of the structure and functionality of various telepresence robots is provided herein.

The telepresence robot 130B also includes a robot arm 134B with an end effector 135B. As used herein, "end effector" may refer to a variety of tools that may be operated by a robot in order to accomplish various tasks. In FIG. 1 the end effector 135B takes the form of a gripper with two opposing "fingers" or "digits." The depicted gripper is one type known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, and so forth. In some implementations, end effector 135B may be removable, and various types of modular end effectors may be installed onto robot arm 134B, depending on the circumstances.

The robot arm 134B and end effector 135B may be controlled autonomously, semi-autonomously, and/or based on control commands provided by a user via a computing device of the user. For example, the robot arm 134B may be autonomously controlled to position the end effector 135B proximal to an object and the end effector 135B may be autonomously controlled to grasp the object. The telepresence robot 130B may utilize the camera 131B and/or other sensors (e.g., a depth sensor) in autonomously controlling the robot arm 134B and/or the end effector 135B.

The telepresence robot 130C also includes a pair of receptacles 136C and 137C extending outwardly from a shaft that extends between the base 133C and the display 132C. Various items may be placed in and retrieved from the receptacles 136C and 137C and transported to various locations by the telepresence robot 130C. For example, an individual in a manufacturing environment may place a manufacturing part in the receptacle 136C at a first location and the telepresence robot 130C may autonomously navigate to a second location where the manufacturing part is needed.

Thus, the illustrated telepresence robots 130A-C each include wheels, a display screen 132A-C and a camera 131A-C, and can each be used to provide "video conferencing on wheels." Telepresence robot 130B also includes the robot arm 134B and end effector 135B (whereas telepresence robots 130A and 130C do not), thereby enabling the telepresence robot 130B to manipulate and/or pick up an object without requiring a human to be physically present in the environment with the telepresence robot 130B. Telepresence robot 130C also includes the receptacles 136C and 137C (whereas telepresence robot 130A and 130B do not), thereby enabling the telepresence robot 130C to store objects placed in the receptacles 136C and 137C (e.g., by a human and/or another robot) and to transport those objects to another location.

Also provided in the environment of FIG. 1 is a user 101, a computing device 120 of the user 101, a robot management system 150, and a network 103. The network 103 may include one or more networks such as a local area network (LAN) and/or or wide area network (WAN) such as the Internet.

The user 101 and the computing device 120 may be located remote from one or more (e.g., all) of the telepresence robots 130A-C. For example, the user 101 and the computing device may be located in another room, another building, another zip code, or another state from one or more of the telepresence robots 130A-C. In FIG. 1 the computing device 120 is a laptop computer. However, additional and/or alternative computing devices may be utilized such as desktop computing device, a tablet computing device, a mobile phone computing device, a computing device of a vehicle of the user (e.g., an in-vehicle communications system, an in-vehicle entertainment system, an in-vehicle navigation system), a wearable apparatus of the user that includes a computing device (e.g., a watch of the user having a computing device, glasses of the user having a computing device), etc.

Also, although only a single user 101 and a single computing device 120 are illustrated in FIG. 1, it is understood that in many implementations multiple users and/or multiple computing devices may be provided. For example, in some implementations multiple users may utilize respective computing devices to establish sessions with multiple of the telepresence robots 130A-C (and/or additional unillustrated robots) to enable performance of multiple robot tasks. Also, for example, in some implementations the user 101 may have a plurality of computing devices and a session between a first computing device of the user 101 and a telepresence robot may be transitioned to a session between the telepresence robot and a second computing device of the user based on one or more signals, such as an explicit user input, a condition sensed by the first computing device and/or second computing device, etc.

Robot management system 150 may include one or computing systems connected by one or more networks (not depicted) and may identify robot tasks and assign those tasks to robots according to one or more techniques described herein. An example of such a computing system is depicted schematically in FIG. 7. The robot management system 150 may, for a robot task of the user 101, select one of the telepresence robots 130A-C for performance of the task and initiate the establishment of a session between the computing device 120 of the user 101 and the selected telepresence robot to enable performance of the robot task via the selected telepresence robot. For example, the robot task may be to remotely attend a meeting and the robot management system 150 may select telepresence robot 130B to perform the task, and initiate establishment of a session between the computing device 120 and the telepresence robot 130B to enable performance of the task. Once the session is established the telepresence robot 130B may provide a video and/or audio feed of its environment to the computing device 120 via the network 103, the computing device 120 may provide a video and/or audio feed of its environment to the telepresence robot 130B via the network 103, the computing device 120 may provide control commands to direct the telepresence robot to a particular location or a particular orientation in response to input provided by the user 101 via the computing device 120, etc.

The robot tasks of users that are identified by the robot management system 150 may be identified in various manners and may be defined with various levels of granularity. For example, in some implementations, the user 101 may provide input via the computing device 120 to explicitly generate a robot task that is provided to the robot management system 150. For example, the user 101 may utilize a graphical interface of the computing device 120 to define an initiation time for the robot task (e.g., "1:00 PM", "now", "as soon as possible", "tomorrow"), a completion time for the robot task (e.g., "1:30 PM", "20 minutes"), a location for the robot task (e.g., "Meeting Room A", "Bob's Office", "Building 1"), robot tool(s) needed for the robot task (e.g., a gripper, a container, a video projector, a Bluetooth communication module), robot functionality needed for the robot task (e.g., autonomous navigation, autonomous object identification, autonomous object grasping, semi-autonomous object grasping), a description of the robot task (e.g., "meeting", "deliver object", "grasp and move object"), etc. The robot task may be defined via the graphical user interface utilizing one or more of various inputs such as drop down menus, free text input, spoken input, etc.

As another example, in some implementations a robot task for the user 101 may be one that is "inferred" based on information related to the user such as, for example, a calendar entry of the user 101, an indication of a location of the user 101, past actions of the user 101, etc. For instance, if a calendar entry of the user 101 has the user 101 scheduled for a meeting at Location A in 5 minutes and an indication of the current location of the user indicates the user is located 20 miles from Location A, a robot task of remotely attending the meeting at location A may be inferred and the duration of the robot task may also be inferred based on the calendar entry.

Various modules or engines may be implemented as part of robot management system 150 as software, hardware, or any combination of the two. For example, in FIG. 1, system 150 includes an available robot selection engine 152, a task engaged robot selection engine 154, a robot session engine 156, and a task engaged robot battery monitoring engine 158.

The available robot selection engine 152 is configured to determine if a robot is available that is suited to perform an identified robot task and, if so, to select the robot to perform the task. As used herein, a robot is "available" for a given time period if it is not performing and/or scheduled to perform a task during the given time period. For example, if a robot task is to remotely attend a meeting for the next 30 minutes, a robot would be available for that task if it is not currently performing a task and is not scheduled to perform a task for the next 30 minutes. In some implementations, the available robot selection engine 152 determines if a robot is available to perform the task based on comparing an explicit or estimated time period for the task to a current status and/or schedule of the robot. In some of those implementations, the schedule of the robot may be maintained in one or more databases remote from the robot such as a relational database. In some of those implementations, the schedule of the robot may additionally and/or alternatively be maintained at the robot itself and the available robot selection engine 152 may communicate with the robot to determine if it is available to perform an identified robot task.

In some implementations, the available robot selection engine 152 determines a robot is suited to perform a task if it is available during a time period of the task. In some other implementations, the available robot selection engine 152 may determine a robot is suited to perform the task based on comparing at least one additional property of the robot task to a property of the robot. For example, a robot task to "remotely attend a meeting" may be mapped to a required robot property of "telepresence robot" or required robot properties of "display screen", "video camera", and "microphone." Also, for example, a robot task of "deliver object" may be mapped to a required robot property of "includes gripper", required robot property of "includes container", and/or to one or more particular robots (e.g., telepresence robots 130A and 130B). Also, for example, a robot task where the user has explicitly indicated a need for a gripper may be mapped to a required robot property of "includes gripper." Mappings between tasks and/or properties of tasks and associated robot properties and/or robots may be provided in memory of the engine 152 and/or in one or more databases accessible by the engine 152. As yet another example of determining a robot is suited to perform a task, an expected duration and/or expected battery load of a robot task may be compared to a charge level of a battery of a candidate robot to determine if the candidate robot is likely to have at least a threshold charge level of battery at the completion of the task. If the candidate robot is likely to have at least the threshold charge level at the completion of the task, the available robot selection engine 152 may determine it is suited to perform the task.

In implementations where the available robot selection engine 152 selects an available robot for a robot task, the robot session engine 156 initiates the establishment of a session between the selected robot and a computing device of the user assigned to the task. For example, the robot session engine 156 may provide a unique identifier of the selected robot to the computing device and/or provide a unique identifier of the computing device to the selected robot to enable the selected robot and the computing device to establish a session with one another. The unique identifiers may include, for example, one or more of an internet protocol (IP) address, media access control (MAC) address, and/or other standardized or non-standardized addresses. In some implementations, the robot session engine 156 and/or another component may serve as an intermediary in establishing the session, whereas in other implementations the selected robot and the computing device may establish a session with one another without an intermediary.

An established session between a computing device and a robot is an interactive data exchange between the computing device and the robot via one or more networks. The data exchanged during the session may include, for example, data transmitted from the robot to the computing device such as sensor data from the robot (e.g., a video and/or audio feed from a camera and microphone of the robot), location data from a location sensor of the robot that provides an indication of the location of the robot, etc. The data exchanged during the session may additionally and/or alternatively include, for example, data transmitted from the computing device to the robot such as a video and audio feed provided by a camera and microphone of the computing device 120, control commands to direct the telepresence robot to a particular location and/or a particular orientation in response to input provided at the computing device 120, etc.

In implementations where a selected robot is capable of autonomous navigation, the available robot selection engine 152 may dispatch the robot to a location for the robot task based on an initiation time of the robot task. For example, for a task that is being actively performed by another robot and/or that is to start immediately, the available robot selection engine 152 may dispatch the robot to a location for the robot task as soon as possible. Also, for example, for a task that is to start at 3:30, the available robot selection engine 152 may dispatch the robot so that it arrives at a location for the robot task at or in advance of 3:30. In some implementations, the available robot selection engine 152 may dispatch the robot to the location for the robot task in advance of the robot session engine initiating the establishment of the session between the robot and the computing device of the user.

As described herein, in some situations the task for which the available robot selection engine 152 selects an available robot may be a task that is being actively performed by another robot. For example, the available robot selection engine 152 may select an available robot to "replace" a task engaged robot that is actively engaged in a task in response to determining a need for the task engaged robot to perform an alternative task. As one example and as described below, the alternative task may be a charging task for charging a battery of the task engaged robot and the need for the task engaged robot to perform the alternative task may be determined by the task engaged robot battery monitoring engine 158 based on a charge level of the battery of the task engaged robot. As another example and as also described below, the alternative task may be an additional robot task of a user and the need to perform the alternative task may be determined by the task engaged robot selection engine 154 based on one or more properties of the alternative task and the task engaged robot.

In some of those situations, the available robot selection engine 152 may identify a current location of the task engaged robot and dispatch a selected available robot to a location that is proximal to the task engaged robot. The available robot selection engine 152 may identify the current location of the task engaged robot based on location data provided by the task engaged robot and/or based on location data associated with the task in which the task engaged robot is engaged.

Moreover, in some of those situations, the robot session engine 156 may initiate the replacement of an active session between the task engaged robot and a computing device of the user with a new session between the selected available robot and the computing device of the user. For example, the robot session engine 156 may initiate the replacement in response to the available robot reaching the location proximal to the task engaged robot.

In some of those implementations, the robot session engine 156 may employ one or more techniques to alleviate the impact of the robot replacement on one or more individuals in the environment with the robot and/or one or more individuals that are controlling the robot and/or consuming data provided by the robot. For example, the robot session engine 156 may identify an orientation of the tasked engaged robot prior to establishment of the new session and direct the selected available robot to mimic the orientation of the task engaged robot at the location proximal to the task engaged robot prior to establishment of the new session. The orientation of the task engaged robot may be identified, for example, based on orientation data provided by the task engaged robot, based on previous locomotive control commands provided to the task engaged robot, and/or based on analysis of one or more images captured of the task engaged robot by the selected available robot. Mimicking the orientation may alleviate the impact of the robot replacement on individuals in the environment with the robot by having the selected available robot assume an orientation that is similar to the orientation of the task engaged robot it is replacing. Moreover, mimicking the orientation may alleviate the impact of the robot replacement on a user of a computing device that is viewing an active video feed from the task engaged robot that is transitioned to a new video feed from the selected available robot (when the new session is established) by having the selected available robot assume an orientation that will provide a camera angle for the new video feed that is similar to the camera angle from the previously active video feed.

As another example, the robot session engine 156 may identify one or more values of one or more characteristics of a camera of the task engaged robot prior to establishment of the new session and direct the alternative telepresence robot to adjust its camera to mimic the values prior to establishing the second session. The values of the characteristics of the camera may be identified, for example, based on data provided by the task engaged robot. The characteristics may include, for example, one or more of a pan of the camera, a tilt of the camera, and a field of view of the camera. For instance, the robot session engine 156 may identify values for a field of the view of the camera of the task engaged robot (e.g., based on a "zoom" level of the camera) and direct the alternative telepresence robot to adjust its camera to mimic that field of view prior to establishing the second session. Mimicking the value of a characteristic of a task engaged camera may alleviate the impact of the robot replacement on a user of a computing device that is viewing an active video feed from the task engaged robot that is transitioned to a new video feed from the selected available robot (when the new session is established) by having the selected available robot assume value(s) for characteristic(s) of the camera that are similar to value(s) for the camera that provided the previously active video feed.

The task engaged robot selection engine 154 is configured to determine if a task engaged robot is available that is suited to perform an identified robot task, and if so, to select the task engaged robot to perform the task when one or more criteria are met. The task engaged robot selection engine 154 may utilize the same and/or similar techniques as described above with respect to the available robot selection engine 152 in determining whether a task engaged robot is "suited" to perform an identified robot task.

In some implementations, the one or more criteria that must be met before the task engaged robot selection engine 154 selects a task engaged robot include that the available robot selection engine 152 is unable to identify an available robot that is suited to perform the identified robot task. In some implementations, the criteria additionally and/or alternatively include that a robot is available that can achieve the current task of the task engaged robot and that can "replace" the task engaged robot in the performance of the current task. In some implementations, the criteria additionally and/or alternatively include that the current task of the task engaged robot is not a higher priority task than the identified robot task. Additional and/or alternative criteria may be utilized.

In some implementations where the task engaged robot selection engine 154 selects a task engaged robot for an identified robot task, the available robot selection engine 152 selects an available robot to replace the task engaged robot in performing the current task of the task engaged robot. In some of those implementations, the available robot selection engine 152 may identify a current location of the task engaged robot and dispatch a selected available robot to a location that is proximal to the task engaged robot. Moreover, in some of those situations, the robot session engine 156 may initiate replacement of an active session between the task engaged robot and a computing device of the user with a new session between the selected available robot and the computing device of the user in response to the available robot reaching the location proximal to the task engaged robot. The robot session engine 156 may further initiate termination of the session between the task engaged robot and the computing device of the user and direct the task engaged robot to an alternative location to perform the identified robot task and/or initiate establishment of a session between the task engaged robot and an additional computing device of an additional user.

The task engaged robot battery monitoring engine 158 may be configured to monitor a charge level of one or more batteries of one or more task engaged robots and selectively determine a charging task for a monitored task engaged robot based on the charge level of the battery of the task engaged robot. In some implementations where the task engaged robot battery monitoring engine 158 determines a charging task for a task engaged robot, it communicates the task to the available robot selection engine 152 and the engine 152 selects an available robot to replace the task engaged robot in performing the current task of the task engaged robot. In some of those implementations, the engine 152 selects the available robot based on determining it is suited to perform the current task. For example, the engine 152 may select the available robot based on determining a charge level of a battery of the available robot is sufficient to last an anticipated remaining duration of the current task of the task engaged robot. The available robot selection engine 152 may identify a current location of the task engaged robot and dispatch a selected available robot to a location that is proximal to the task engaged robot. Moreover, in some of those situations, the robot session engine 156 may initiate replacement of an active session between the task engaged robot and a computing device of the user with a new session between the selected available robot and the computing device of the user in response to the available robot reaching the location proximal to the task engaged robot. The robot session engine 156 may further initiate termination of the session between the task engaged robot and the computing device of the user and direct the task engaged robot to a charging station to enable charging of the battery of the task engaged robot.

In some implementations, the task engaged robot battery monitoring engine 158 may determine the need for a telepresence robot to perform the charging task based on a charge level of a battery of the telepresence robot failing to satisfy a threshold charge level, such as a threshold percentage, amp hours, or other indication of charge level. In some implementations, the task engaged robot battery monitoring engine 158 may determine the need for a telepresence robot to perform the charging task based on identifying an anticipated end time of the robot task of the user and determining a charge level of the battery at the anticipated end time will fail to satisfy a threshold charge level. For example, the charge level of the battery at the anticipated end time may be estimated based on a current charge level of the battery and anticipated battery drain that will occur by the anticipated end time. The anticipated battery drain that will occur by the anticipated end time may be determined with reference to a formula and/or a table and may take into account an amount of time, properties of the current task, etc. Properties of the current task may include, for example, the current or anticipated state of components of the robot such as whether a display screen of the robot is active and/or will remain active, whether and/or to what extent motors of the robot are currently being driven to drive wheels or other components of the robot, whether and/or to what extent motors of the robot will be driven to drive components of the robot, etc.

The engine 158 may utilize one or more sources to identify an anticipated end time for a robot task in implementations where the engine 158 determines the need for a telepresence robot to perform the charging task based on the anticipated end time of the robot task. For example, the task engaged robot battery monitoring engine 158 identify electronically stored calendar data that is personal to the user, identify a scheduled end time of the robot task of the user based on the electronically stored calendar data, and utilize the scheduled end time as the anticipated end time. Also, for example, where a user has provided explicit input to the robot management system 150 that indicates an anticipated duration or an end time, such input may be utilized. Also, for example, mappings between tasks and/or properties of tasks and anticipated durations for the tasks may be provided in memory of the engine 152 and/or in one or more databases accessible by the engine 152 and utilized to determine an anticipated end time. In some implementations, the anticipated durations of the mapping may have been determined based on actual durations of past tasks.

While telepresence robots 130A-C and system 150 are depicted separately in FIG. 1, this is not meant to be limiting. In various implementations, one or more aspects of robot management system 150 may be implemented on one or more of the telepresence robots 130A-C. For example, one or more of the engines 152, 154, 156, and or 158 may be distributed across multiple of the telepresence robots 130A-C. For instance, each of the robots may include one or more aspects of task engaged robot battery monitoring engine 158 and monitor a charge level of its own battery and selective determine a need to perform a battery charging task based on the charge level of its own battery. In implementations where the telepresence robots 130A-C and system 150 are separate components, they may communicate over one or more wired or wireless networks (not depicted) or using other wireless technology, such as radio, Bluetooth, infrared, etc.

Figure 2A:
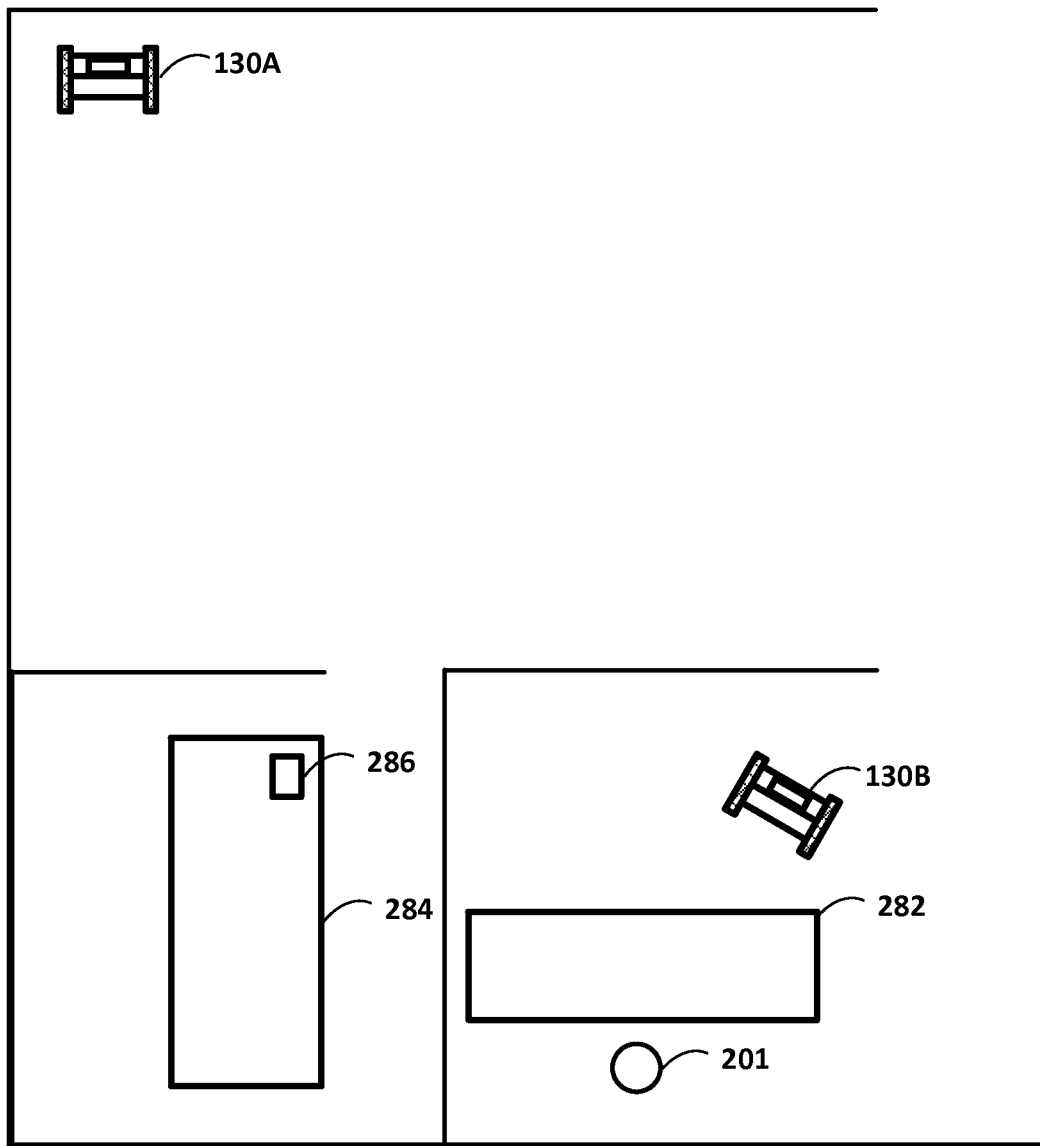
FIG. 2A illustrates a plan view of a portion of a building at a first time and illustrates a first robot engaged in a task and a second robot that is available.

With reference to FIGS. 2A-2D and FIG. 3, further examples are provided of aspects of robot management system 150. FIG. 2A illustrates a plan view of a portion of a building at a first time and illustrates plan views of telepresence robots 130A and 130B. In FIG. 2A telepresence robot 130B is engaged in a video conferencing task and is in an active session with a computing device of a user. In the active session the telepresence robot 130B is providing the computing device with a live video and audio feed to enable the user to view portions of desk 282 and individual 201 and hear sounds that are audible to a microphone of the telepresence robot 130B. The telepresence robot 130B may have been "available" at a prior time before the time of FIG. 2A and the available robot selection engine 152 may have selected the telepresence robot 130B based on one or more criteria described herein. For example, at the prior time the available robot selection engine 152 may have selected the telepresence robot 130B based on it being the only available robot suitable for the task (e.g., telepresence robot 130A and other suitable robots may have been task engaged at the prior time). In FIG. 2A, telepresence robot 130B is now "task engaged" and telepresence robot 130A is now "available".

Figure 3:
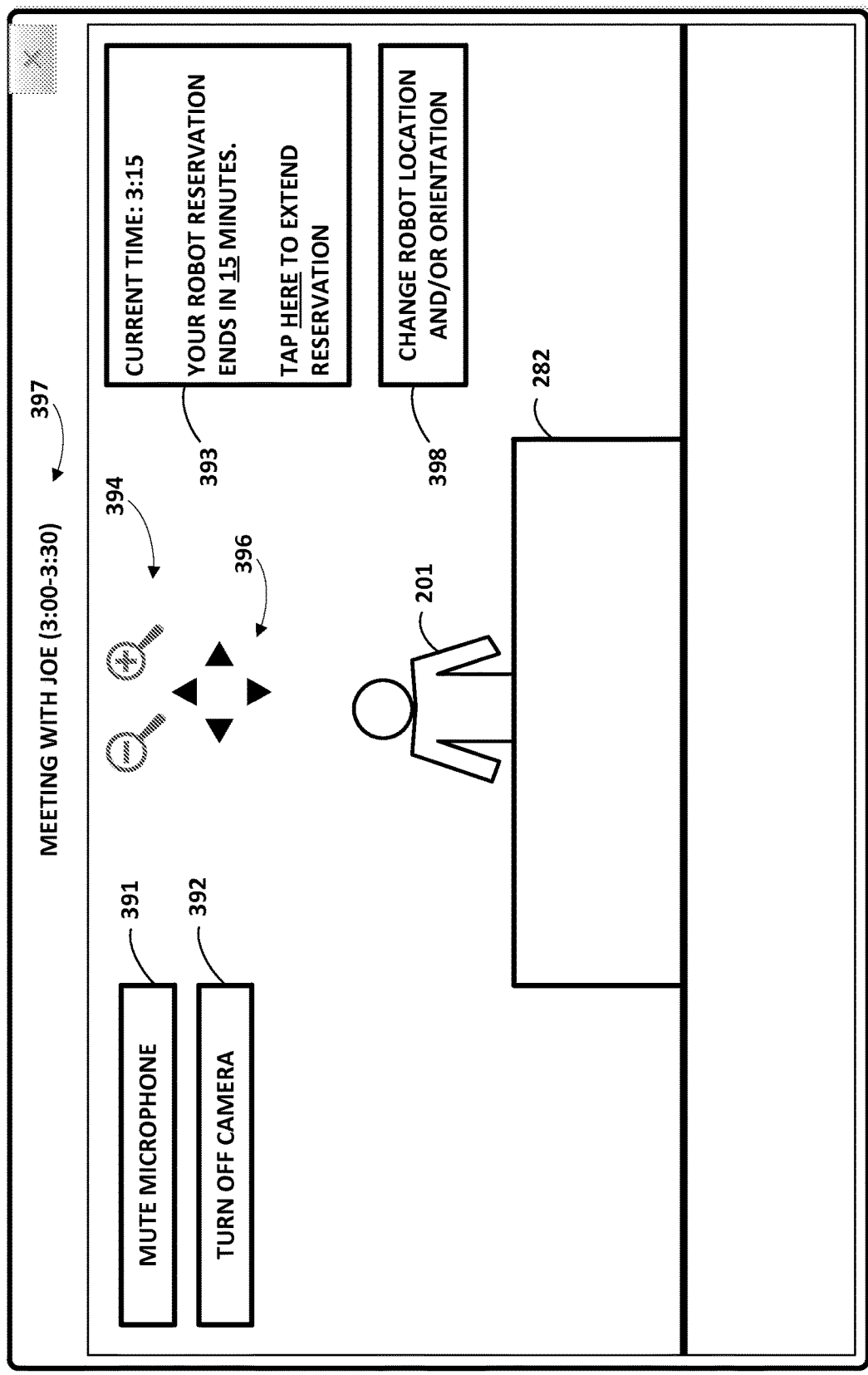
FIG. 3 illustrates an example graphical interface for providing a video feed of a telepresence robot to a user.

Referring to FIG. 3, an example of a graphical interface for providing the video feed from the telepresence robot 130B in FIG. 2A is illustrated. The graphical interface of FIG. 3 may be graphically represented on a display of the computing device that has an established session with the telepresence robot 130B. In FIG. 3, the desk 282 and the individual 201 depicted in FIG. 2A are visible on the graphical interface as a result of the video feed transmitted by the telepresence robot 130B. The graphical interface of FIG. 3 also includes a title 397 that provides a description of the robot task ("Meeting with Joe") and a scheduled time for the robot task ("3:00-3:30"). The graphical interface of FIG. 3 also includes interface element 391 that can be selected by the user to mute the microphone of the computing device being utilized by the user and interface element 392 that can be selected by the user to turn off the camera of the computing device being utilized by the user. The interface elements 391 and 392 enable the user to direct whether sound from the user's environment is provide on the speaker of the telepresence robot 130B and whether video from the user's environment is provided on the display device 132A of the telepresence robot 130A. The graphical interface of FIG. 3 also includes a robot reservation interface element 393 that displays the current time, when the user's reservation of the telepresence robot 130B will end (the scheduled duration of the robot task), and a selectable option for the user to extend the user's reservation of the telepresence robot 130B (extend the scheduled duration of the robot task).

The graphical interface of FIG. 3 also includes pan (the left/right arrow heads) and tilt (the up/down arrow heads) user interface elements 396 that may be selected by the user to provide control commands to the telepresence robot 130B to adjust the pan and/or tilt of the camera of the telepresence robot 130B (and resultantly affect the view of the provided live video feed). The graphical interface of FIG. 3 also includes zoom in ("+") and zoom out ("−") user interface elements 394 that may be selected by the user to provide control commands to the telepresence robot 130B change the field of view of the camera of the telepresence robot 130B (and resultantly affect the view of the provided live video feed).

The graphical interface of FIG. 3 also includes a change robot location and/or orientation user interface element 398 that may be selected by the user to enable the user to change the location and/or orientation of the telepresence robot 130B. Selecting the user interface element 398 may enable the user to provide control commands to "actively" control the location and/or orientation of the telepresence robot 130B or provide target locations and/or orientations that may be automatically adapted by the telepresence robot 130B.

Figure 2B:
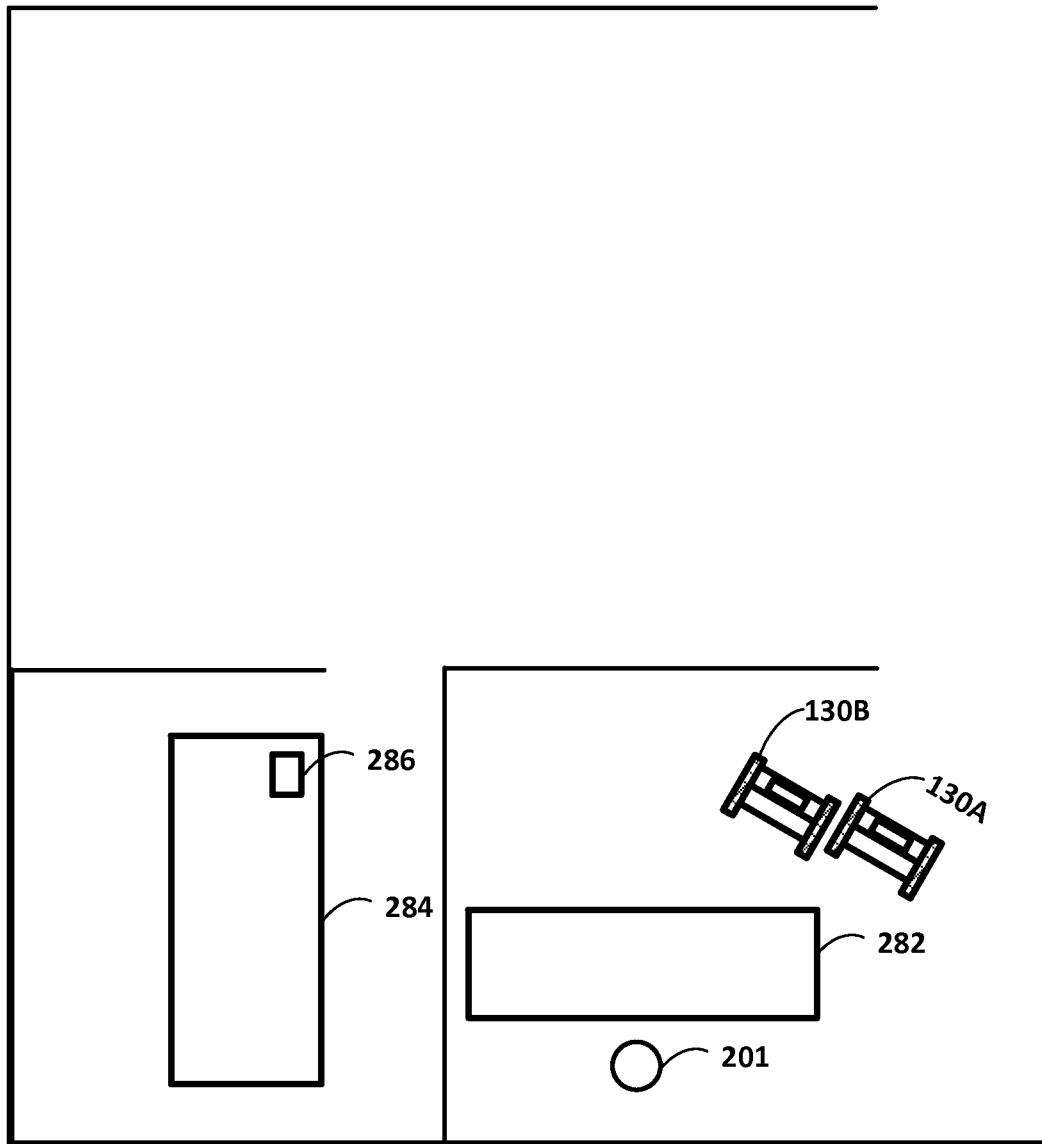
FIG. 2B illustrates the plan view of the portion of the building at a second time that is later than the first time of FIG. 2A, and illustrates the second robot after it has navigated to a location that is more proximal to the first robot than its location in FIG. 2A and after it has mimicked the orientation of the first robot.

FIG. 2B illustrates the plan view of the portion of the building at a second time that is later than the first time of FIG. 2A. In FIG. 2B telepresence robot 130B is still engaged in the video conferencing task and telepresence robot 130A has navigated to a location that is more proximal to the telepresence robot 130B than its location in FIG. 2A.

Moreover, in FIG. 2B the telepresence robot 130A has adjusted to an orientation that mimics the orientation of the telepresence robot 130B.

The telepresence robot 130A may have navigated to the location of FIG. 2B and mimicked the orientation of the telepresence robot 130B in response to direction from the robot management system 150. For example, a new task may have been received at the time of FIG. 2A to pick up the object 286 from the table 284. The available robot selection engine 152 may have been unable to find an available robot suitable to perform the task since the only available robot at the time of FIG. 2A was telepresence robot 130A, which does not include the required gripper to perform the task. Further, the task engaged robot selection engine 154 may have determined the task engaged telepresence robot 130B is suitable to perform the "pick up the objet 286" task since it includes a robot arm 134B and gripper end effector 135B—and the available robot selection engine 152 may have determined that the available telepresence robot 130A is suitable to perform the video conferencing task for which the telepresence robot 130B is currently engaged.

Based on these determinations, the available robot selection engine 152 may have identified a current location of the task engaged telepresence robot 130B and dispatched the available telepresence robot 130A to the location of FIG. 2B that is proximal to the task engaged telepresence robot 130B. Moreover, the robot session engine 156 may have identified an orientation of the task engaged telepresence robot 130B and directed the available telepresence robot 130A to mimic that orientation at the location of FIG. 2B. In some implementations, the robot session engine 156 may have further identified one or more values of one or more characteristics of a camera of the task engaged telepresence robot 130B and directed the available telepresence robot 130A to adjust its camera to mimic those values.

When the available telepresence robot 130A is in the position of FIG. 2B, the robot session engine 156 may initiate the replacement of the active session between the task engaged telepresence robot 130B and the computing device of the user with a new session between the available telepresence robot 130A and the computing device of the user. Due to the location of the telepresence robot 130A, the mimicking of the orientation by the telepresence robot 130A, and/or the mimicking of the camera characteristic values by the telepresence robot 130A, the video feed provided by the telepresence robot 130A to the computing device when the new session is active may be similar to that provided in the prior session by telepresence robot 130B. For example, the video feed may be similar to that illustrated in FIG. 3.

Figure 2C:
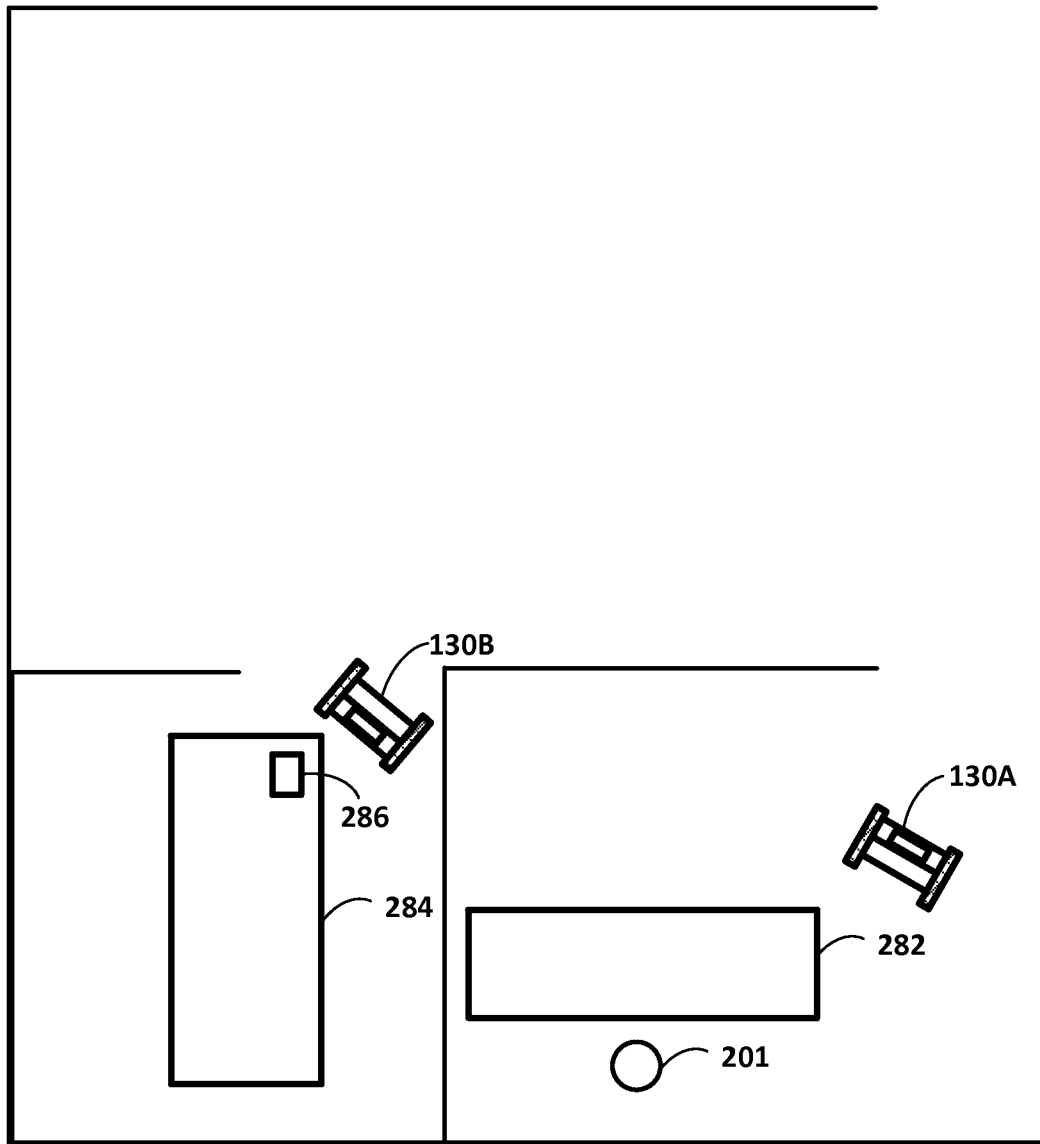
FIG. 2C illustrates the plan view of the portion of the building at a third time that is later than the second time of FIG. 2B, and illustrates the first robot after it has navigated to an alternative location to perform an alternative task.

FIG. 2C illustrates the plan view of the portion of the building at a third time that is later than the second time. In FIG. 2C the new session is still active between the telepresence robot 130A and the computing device. Moreover, in FIG. 2C the telepresence robot 130B has navigated to a location near the object 286 to perform the alternative task of picking up the object 286. The telepresence robot 130B may have navigated to the location of FIG. 2C in response to direction from the robot management system 150. For example, after the robot session engine 156 initiated replacement of the telepresence robot 130B with the telepresence robot 130A in FIG. 2B, the robot session engine 156 may have directed the telepresence robot 130A to the location of FIG. 2D. FIGS. 2A-C provide a specific example of selecting an available robot to "replace" a task engaged robot that is actively engaged in a task in response to determining a need for the task engaged robot to perform an alternative robot task of a user. However, other examples are within the scope of the present disclosure. For example, in some implementations the alternative task may be a charging task for charging a battery of the task engaged robot and the need for the task engaged robot to perform the alternative task may be determined by the task engaged robot battery monitoring engine 158 based on a charge level of the battery of the task engaged robot.

Figure 4:
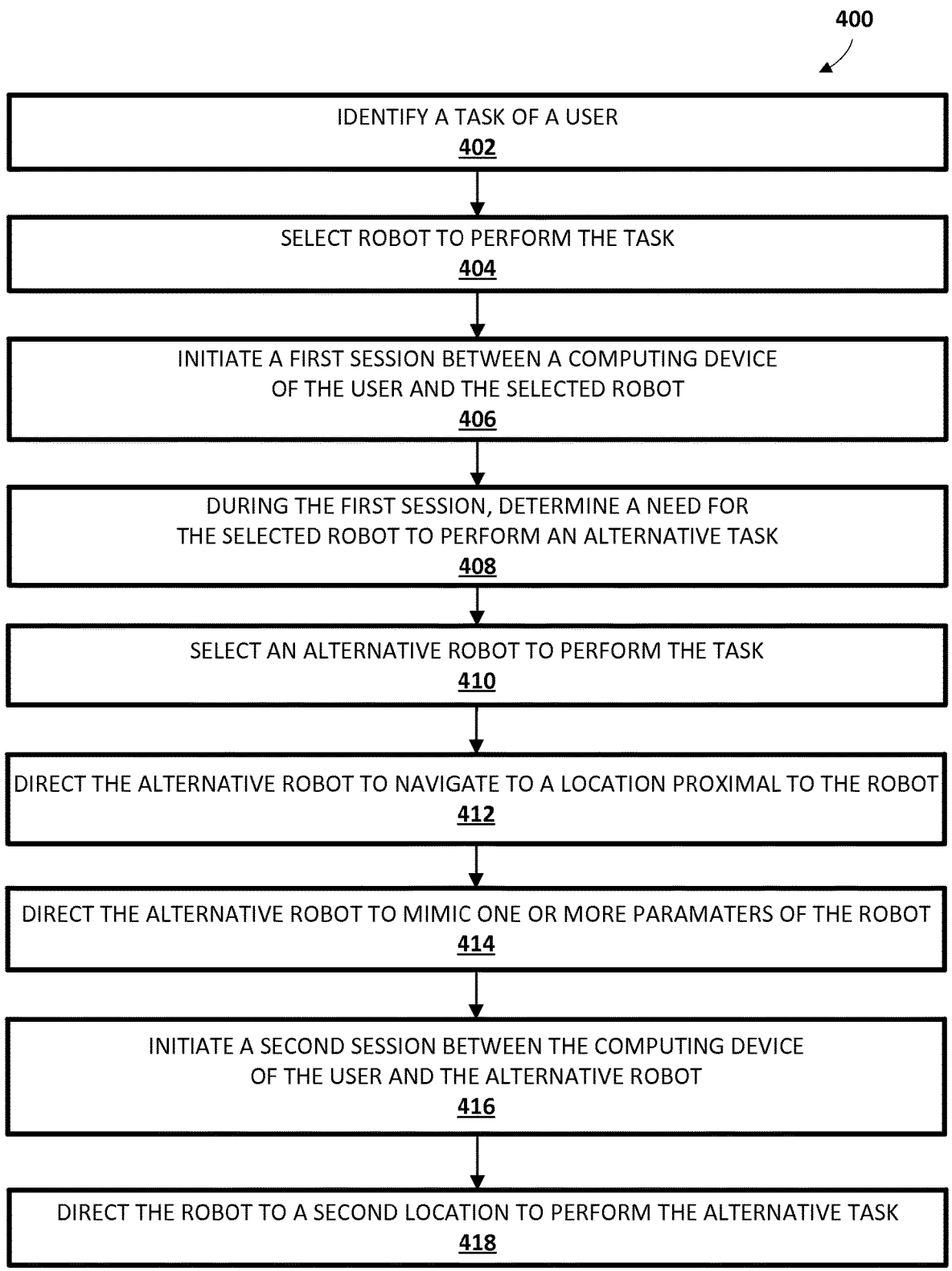
FIG. 4 depicts a flow chart illustrating an example method of replacing a robot that is engaged in a task with an alternative robot to enable the alternative robot to perform the task and to enable the robot to perform an alternative task.

FIG. 4 depicts a flow chart illustrating an example method of replacing a robot that is engaged in a task with an alternative robot to enable the alternative robot to perform the task and to enable the robot to perform an alternative task. For convenience, the operations of the flow chart are described with reference to a system that performs the operations. This system may include various components of various computer systems, such as robot management system 150 of FIG. 1. Moreover, while operations of method 400 are shown in a particular order, this is not meant to be limiting. One or more operations may be reordered, omitted or added.

At block 402, the system identifies a task of a user. For example, in some implementations, the system identifies a robot task that has been generated based on explicit input provided by a user via a computing device 120. Also, for example, in some implementations, the system identifies a robot task of a user that has been inferred based on information related to the user, such as a calendar entry of the user.

At block 404, the system selects a robot to perform the task. For example, the system may determine if a robot is available that is suited to perform an identified robot task and, if so, may select the robot to perform the task. A robot is "available" for a given time period if it is not performing and/or scheduled to perform a task during the given time period. For example, if a robot task is to remotely attend a meeting for the next 30 minutes, a robot would be available for that task if it is not currently performing a task and is not scheduled to perform a task for the next 30 minutes. In some implementations, the system determines a robot is suited to perform a task if it is available during a time period of the task. In some other implementations, the system may determine a robot is suited to perform the task based on comparing at least one additional property of the robot task to a property of the robot.

At block 406, the system initiates a first session between a computing device of the user and the selected robot. For example, system may provide a unique identifier of the selected robot to the computing device and/or provide a unique identifier of the computing device to the selected robot to enable the selected robot and the computing device to establish a session with one another.

At block 408, during the first session the system determines a need for the selected robot to perform an alternative task. For example, the alternative task may be a charging task for charging a battery of the task engaged robot and the need for the task engaged robot to perform the alternative task may be determined by the system based on a charge level of the battery of the task engaged robot. As another example, the alternative task may be an additional robot task of a user and the need to perform the alternative task may be determined by the system based on one or more properties of the alternative task and the task engaged robot.

At block 410, the system selects an alternative robot to perform the task of block 402. For example, the system may determine if an alternative robot is available that is suited to perform the task and, if so, may select the alternative robot to perform the task.

At block 412, the system directs the alternative robot to navigate to a location proximal to the robot. For example, the system may identify a current location of the robot and dispatch the alternative robot to a location that is proximal to the task engaged robot. The system may identify the current location of the robot based on location data provided by the robot and/or based on location data associated with the task in which the robot is engaged.

At block 414, the system directs the alternative robot to mimic one or more parameters of the robot. For example, the system may identify an orientation of the robot prior and direct the alternative robot to mimic the orientation of the robot at the location proximal to the task engaged robot. As another example, the system may identify one or more values of one or more characteristics of a camera of the robot prior to establishment of the new session and direct the alternative robot to adjust its camera to mimic the values prior to establishing the second session.

At block 416, the system initiates a second session between the computing device of the user and the alternative robot. For example, the system may initiate the replacement of an active session between the task engaged robot and a computing device of the user with a new session between the selected available robot and the computing device of the user. In some implementations, the system may initiate the replacement in response to the available robot reaching the location proximal to the task engaged robot.

At block 418, the system directs the robot to a second location to perform the alternative task.

Figure 5:
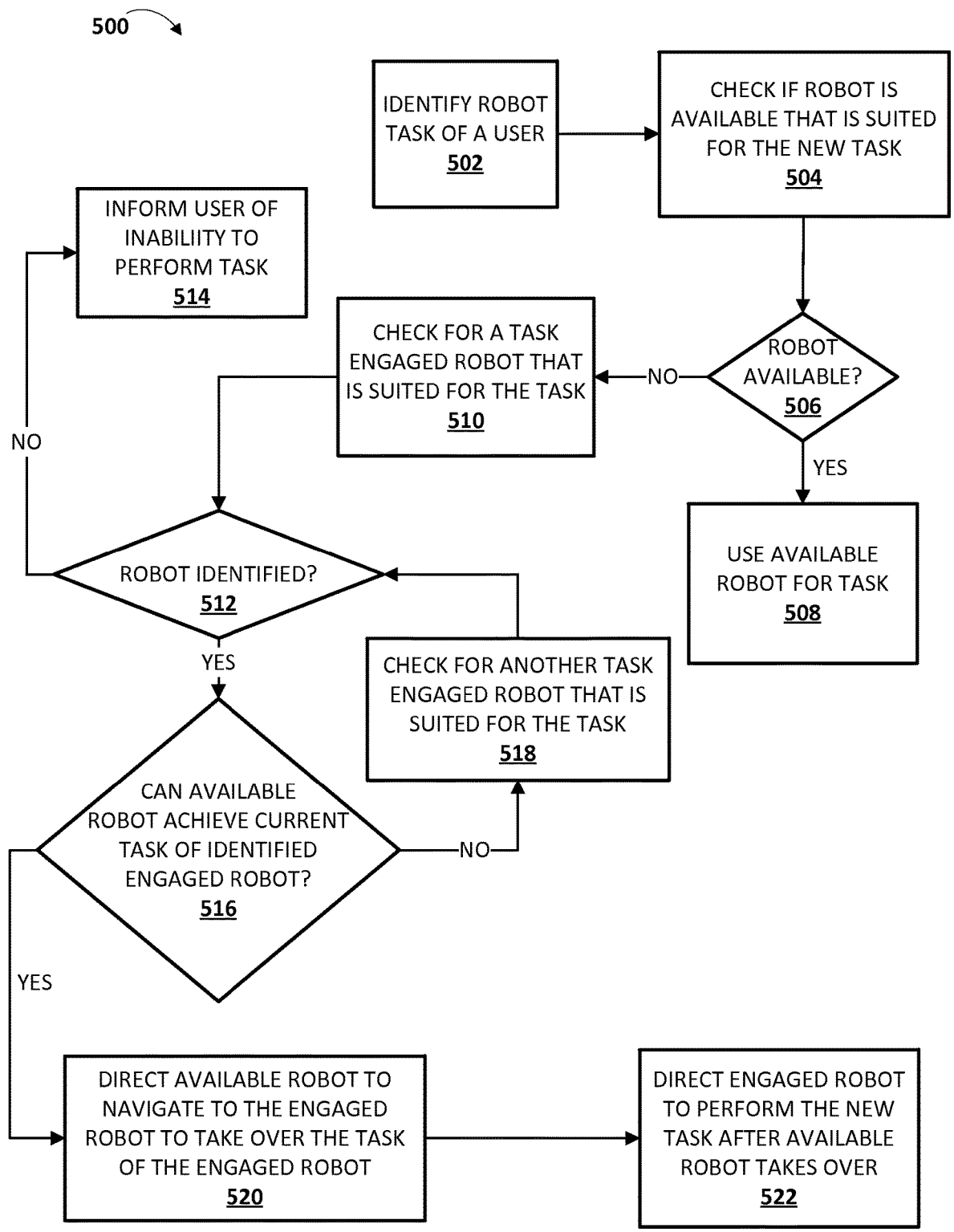
FIG. 5 depicts a flow chart illustrating an example method of assigning a robot task of a user to a robot.

FIG. 5 depicts a flow chart illustrating an example method of assigning a robot task of a user to a robot. For convenience, the operations of the flow chart are described with reference to a system that performs the operations. This system may include various components of various computer systems, such as robot management system 150 of FIG. 1. Moreover, while operations of method 500 are shown in a particular order, this is not meant to be limiting. One or more operations may be reordered, omitted or added.

At block 502, the system identifies a robot task of a user. At block 504, the system checks if a robot is available that is suited for the task identified at block 502.

At block 506, the system determines whether a robot is available that is suited for the robot task identified at block 502. If the system determines a robot is available, the system uses the available robot for the task at block 508. For example, the system may initiate a session between the available robot and a computing device of the user at an initiation time of the task to enable performance of the task. If the system determines a robot is not available, the system checks for a task engaged robot that is suited for the task at block 510.

At block 512, the system determines whether a task engaged robot is identified that is suited for the task. If the system determines a task engaged robot is not available, the system informs the user of the inability to perform the task at block 514. If the system determines a task engaged robot is identified, the system determines whether an available robot can achieve the current task of the identified engaged robot at block 516.

If the system determines the available robot cannot achieve the current task of the identified robot at block 516, the system proceeds to block 518 where it again checks for another task engaged robot that is suited for the task, then proceeds back to block 512. If the system determines the available robot can achieve the current task of the identified robot at block 516, the system proceeds to block 520 where it directs the available robot to navigate to the engaged robot to take over the task of the engaged robot. At block 522, the system then directs the engaged robot to perform the new task after the available robot takes over for the task engaged robot.

Figure 6:
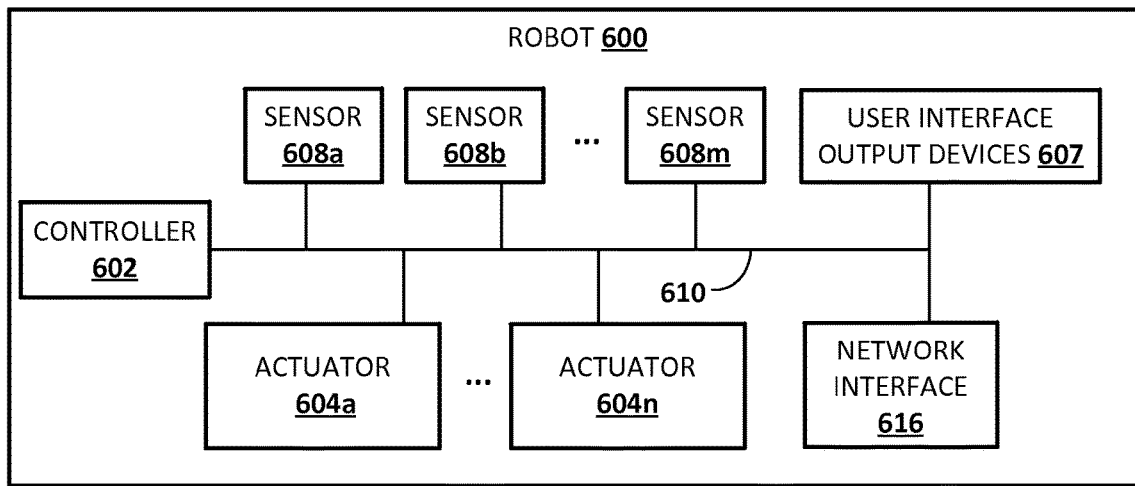
FIG. 6 schematically depicts an example architecture of a robot.

FIG. 6 schematically depicts an example architecture of a robot. Robot 600 may take various forms, including but not limited to a telepresence robot such as telepresence robots 130A-C described above, a humanoid form, an animal form, a wheeled device, a submersible vehicle, an unmanned aerial vehicle ("UAV"), and so forth. In various implementations, robot 600 may include a controller 602. Controller 602 may take various forms, such as one or more processors, one or more field-programmable gate arrays ("FPGA"), one or more application-specific integrated circuits ("ASIC"), one or more so-called "real time controllers," and so forth.

In various implementations, controller 602 may be operably coupled with one or more actuators 604*a-n* and/or one or more sensors 608*a-m*, e.g., via one or more buses 610. Sensors 608*a-m* may take various forms, including but not limited to cameras, depth sensors, light sensors, pressure sensors, pressure wave sensors (e.g., microphones), proximity sensors, accelerometers, gyroscopes, thermometers, barometers, and so forth. While sensors 608*a-m* are depicted as being integral with robot 600, this is not meant to be limiting. In some implementations, one or more sensors 608*a-m* may be located external to robot 600, e.g., as standalone units.

Controller 602 may provide control commands to the actuators 604*a-n* to accomplish one or more tasks. Those control commands include commands that direct the actuators 604*a-n* to drive wheels and/or other components to enable the robot 600 to traverse one or more paths autonomously, semi-autonomously, and/or in response to control commands provided by a computing device in response to user interface input at the computing device. Controller 602 may further provide control commands to generate one or more indicia of a user of a computing device that is in a session with robot 600 on a user interface output device 622 (e.g., a display) of the robot 600. For example, controller 602 may cause a video feed transmitted by the computing device to be generated on a user interface output device 622 that is a display. Controller 602 may further receive and act upon control commands received from a computing device, and/or provide a visual and/or audio feed from one or more of the sensors 608*a-m* and/or other data to the computing device. Also, for example, the controller 602 may establish a session with a computing device via network interface subsystem 616. Network interface subsystem 616 provides an interface to outside networks and is coupled to one or more corresponding interface devices in one or more other computer systems such as a computing device engaged in a session with the robot. In some implementations, robot 600 may incorporate, in addition to other components, one or more aspects of a computer system, such as computer system 710 described below.

Figure 7:
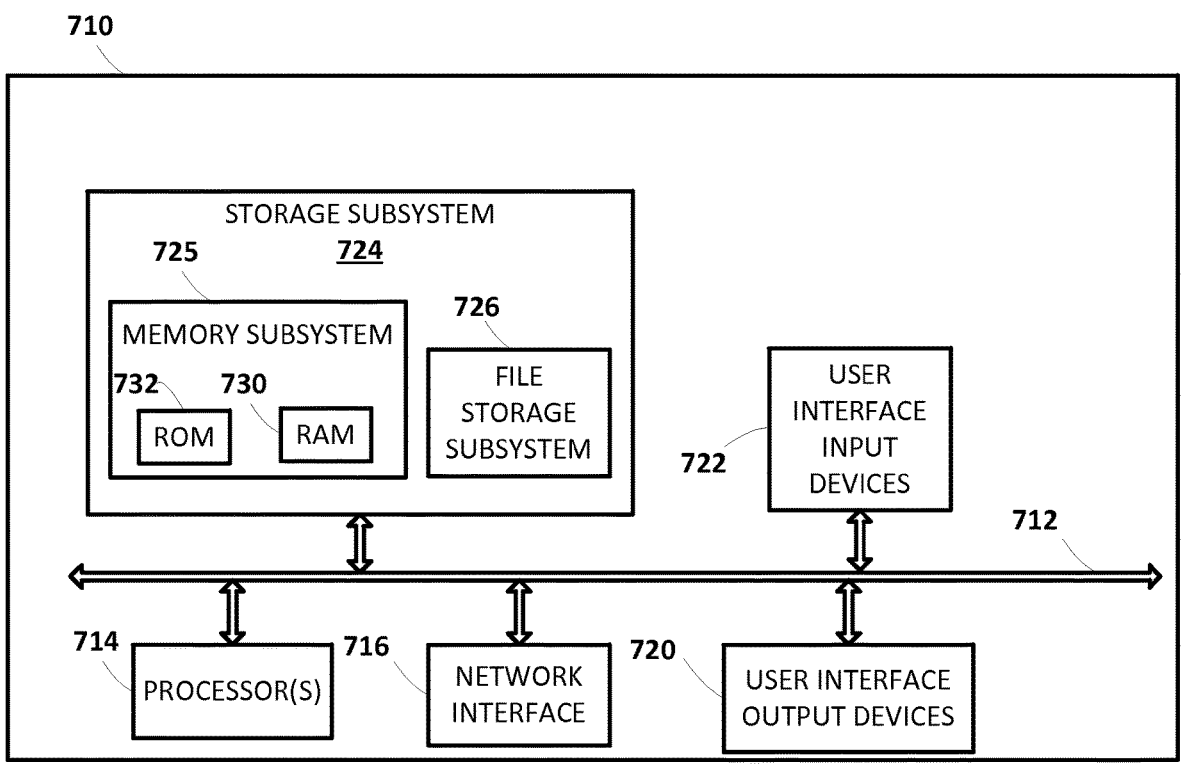
FIG. 7 schematically depicts an example architecture of a computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of method 400, method 500 and/or to implement one or more aspects of controller 602, engine 152, engine 154, engine 156, and/or engine 158. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a CD-ROM drive, an optical drive, or removable media cartridges. Modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
    identifying a robot task of a user;
    selecting a first robot to perform the robot task;
    identifying a computing device of the user that is located remote from the first robot;
    establishing a first session between the computing device and the first robot to perform the robot task, wherein during the first session:
        the computing device displays a first robot video feed, the first robot video feed being transmitted to the computing device from the first robot, and being a feed from a first robot camera of the first robot;
    during the first session, determining a need for the first robot to perform an alternative task;
    selecting a second robot to perform the robot task in response to determining the need for the first robot to perform the alternative task;
    directing the second robot to navigate to a location proximal to the first robot;
    determining that the second robot has reached the location proximal to the first robot;
    in response to determining the second robot has reached the location proximal to the first robot:
        replacing the first session with a second session between the computing device and the second robot to perform the robot task, wherein during the second session:
            the first robot video feed is replaced by a second robot video feed, the second robot video feed being transmitted to the computing device from the second robot, and being from a second robot camera of the second robot; and
    in response to determining the second robot has reached the location proximal to the first robot:
        directing the first robot to a second location to perform the alternative task.

2. The method of claim 1, wherein during the first session the computing device transmits, to the first robot, a computing device audio feed from a computer microphone of the computing device, and during the second session the computing device instead transmits the computing device audio feed to the second robot.

3. The method of claim 1, wherein the alternative task is an additional robot task of an additional user; and
    wherein determining the need for the first robot to perform the alternative task comprises:
        identifying the alternative task; and
        determining that the first robot is capable of performing the alternative task and that the second robot is incapable of performing the alternative task.

4. The method of claim 1, wherein the alternative task is an additional robot task of an additional user; and
wherein determining the need for the first robot to perform the alternative task comprises:
identifying the alternative task;
identifying an anticipated duration of the alternative task; and
determining that the first robot is better suited than the second robot to perform the alternative task based on:
determining that a charge level of a battery of the first robot at an end of the anticipated duration will satisfy a threshold charge level; and
determining that a charge level of a battery of the second robot at the end of the anticipated duration will fail to satisfy the threshold charge level.

5. The method of claim 4, further comprising:
identifying an anticipated remaining duration of the robot task;
wherein selecting the second robot to perform the robot task is further in response to:
determining that the charge level of the battery of the second robot is sufficient to last the anticipated remaining duration.

6. The method of claim 1, wherein the alternative task is a charging task for charging a battery of the first robot,
wherein determining the need for the first robot to perform the charging task comprises:
identifying a scheduled end time of the robot task of the user; and
determining a charge level of the battery at the scheduled end time will fail to satisfy a threshold charge level.

7. The method of claim 6, further comprising:
identifying electronically stored calendar data that is personal to the user; and
identifying the scheduled end time of the robot task of the user based on the electronically stored calendar data.

8. A system comprising:
a first robot;
a second robot; and
an available robot selection engine configured to select the first robot to perform a robot task of a user in response to determining the first robot is available and capable of performing the robot task;
wherein the first robot is configured to establish a first session with a computing device of the user based on the selection of the first robot by the available robot selection engine, wherein during the first session:
the computing device displays a first robot video feed, the first robot video feed being transmitted to the computing device from the first robot, and being a feed from a first robot camera of the first robot;
wherein the available robot selection engine is further configured to:
select the second robot to replace the first robot in performance the robot task of the user in response to a determination, during the first session, of a need for the first robot to perform an alternative task;
direct the second robot to navigate to a location proximal to the first robot;
determine that the second robot has reached the location proximal to the first robot;
in response to determining the second robot has reached the location proximal to the first robot:
replace the first session with a second session between the computing device and the second robot to perform the robot task, wherein during the second session:
the first robot video feed is replaced by a second robot video feed, the second robot video feed being transmitted to the computing device from the second robot, and being from a second robot camera of the second robot; and
in response to determining the second robot has reached the location proximal to the first robot:
direct the first robot to a second location to perform the alternative task.

9. The system of claim 8, wherein during the first session the computing device transmits, to the first robot, a computing device audio feed from a computer microphone of the computing device, and during the second session the computing device instead transmits the computing device audio feed to the second robot.

10. The system of claim 8, wherein the alternative task is an additional robot task of an additional user, and wherein the available robot selection engine is further configured to determine the need for the first robot to perform the alternative task, wherein in determining the need for the first robot to perform the alternative task the available robot selection engine is configured to:
identify the alternative task; and
determine that the first robot is capable of performing the alternative task and that the second robot is incapable of performing the alternative task.

11. The system of claim 8, wherein the alternative task is an additional robot task of an additional user and wherein the available robot selection engine is further configured to determine the need for the first robot to perform the alternative task, wherein in determining the need for the first robot to perform the alternative task the available robot selection engine is configured to:
identify the alternative task;
identify an anticipated duration of the alternative task; and
determine that the first robot is better suited than the second robot to perform the alternative task based on determining that:
a charge level of a battery of the first robot at an end of the anticipated duration will satisfy a threshold charge level; and
a charge level of a battery of the second robot at the end of the anticipated duration will fail to satisfy the threshold charge level.

12. The system of claim 11, wherein the available robot selection engine is further configured to:
identify an anticipated remaining duration of the robot task;
wherein in selecting the second robot to perform the robot task the available robot selection engine is further configured to:
determine that the charge level of the battery of the second robot is sufficient to last the anticipated remaining duration.

13. The system of claim 8, wherein the alternative task is a charging task for charging a battery of the first robot, and wherein the available robot selection engine is further configured to determine the need for the first robot to perform the alternative task, wherein in determining the need for the first robot to perform the alternative task the available robot selection engine is configured to:
identify a scheduled end time of the robot task of the user; and determine a charge level of the battery at the scheduled end time will fail to satisfy a threshold charge level.

14. The system of claim 13, wherein the available robot selection engine is further configured to:
identify electronically stored calendar data that is personal to the user; and
identify the scheduled end time of the robot task of the user based on the electronically stored calendar data.

* * * * *